US010325047B2

(12) United States Patent
Chang

(10) Patent No.: US 10,325,047 B2
(45) Date of Patent: Jun. 18, 2019

(54) POWER NETWORK REDUCTION AND SIMULATION IN TIME AND FREQUENCY DOMAINS TO CALCULATE VOLTAGE DROP

(71) Applicant: Mau-chung Chang, Hillsborough, CA (US)

(72) Inventor: Mau-chung Chang, Hillsborough, CA (US)

(73) Assignee: Sage Software, Inc., Hillsborough, CA (US)

( * ) Notice: Subject to any disclaimer, the term of this patent is extended or adjusted under 35 U.S.C. 154(b) by 807 days.

(21) Appl. No.: 14/872,153

(22) Filed: Oct. 1, 2015

(65) Prior Publication Data

US 2016/0097795 A1    Apr. 7, 2016

Related U.S. Application Data

(60) Provisional application No. 62/059,814, filed on Oct. 3, 2014.

(51) Int. Cl.
*G06F 17/50*    (2006.01)

(52) U.S. Cl.
CPC ...... *G06F 17/5036* (2013.01); *G06F 2217/78* (2013.01); *Y02E 60/76* (2013.01); *Y04S 40/22* (2013.01)

(58) Field of Classification Search
CPC .................................. G06F 17/5036
USPC .................................... 703/13, 14
See application file for complete search history.

(56) References Cited

U.S. PATENT DOCUMENTS

| 5,313,398 | A | * | 5/1994 | Rohrer ............... G06F 17/5036 |
| | | | | 703/14 |
| 5,878,053 | A | | 3/1999 | Koh et al. |
| 5,933,358 | A | * | 8/1999 | Koh .................... G06F 17/5022 |
| | | | | 703/14 |
| 6,748,572 | B2 | | 6/2004 | Fujine |
| 7,797,654 | B2 | | 9/2010 | Tai et al. |

(Continued)

OTHER PUBLICATIONS

L. T. Pillage and R. A. Rohrer, "Asymptotic waveform evaluation for timing analysis," IEEE Trans. on CAD, vol. 9, pp. 352-366, Apr. 1990.

(Continued)

*Primary Examiner* — Andre Pierre Louis

(57) ABSTRACT

In the present invention the issue of calculating voltage drop at the contact points of the power network with injected power currents is proposed. The method consists of the three steps. First, the said power network is partitioned into sub-networks. Secondly, the said sub-networks are expressed in terms of their admittance matrices and voltage transfer functions, which are then fed into timing simulator handling both time and frequency to compute the voltage drop at the said contact points. To achieve better partition result, inputs, outputs including user assigned nodes for recording voltages, are utilized to absorb the sub-network without inputs and outputs into the same partition as its parent node, and generate output cone with single input and outputs. Timing simulator uses convolution to get input voltage at each time step recursively and then voltage transfer used to evaluate output voltage at the same time step with minimal computational overhead.

10 Claims, 13 Drawing Sheets

(56) References Cited

U.S. PATENT DOCUMENTS 8,543,360 B2 * 9/2013 Nakhla ............... G06F 17/5036
703/2
10,024,892 B2 * 7/2018 Johannsson ............... H02J 3/18

OTHER PUBLICATIONS

Shen Lin and Ernest S. Kuh, "Transient Simulation of Lossy Interconnect," Proc. DAC, Jun. 1992, pp. 81-86.
V. Raghavan, J. E. Bracken, and R. A. Rohrer, "AWESpice: A general tool for the accurate and efficient simulation of interconnect problems," Proc. DAC , Jun. 1992, 87-92.
K. J. Kerns, I. L. Wemple, and A. T. Yang, "Stable and efficient reduction of substrate model networks using congruence transforms," ICCAD Nov. 1995, pp. 207-214.
Haifang Liao and Wei-Ming Dai, "Partitioning and Reduction of RC Interconnect Networks Based on Scattering Parameter Macromodels," ICCAD Nov. 1995, pp. 704-709.
P. Feldmann and R. W. Freund, "Efficient linear circuit analysis by Pade' approximation via the Lanczos process," IEEE Trans. on CAD, vol. 14, pp. 639-649, May 1995.
Altan Odabasioglu, Mustafa Celik and Lawrence T. Pileggi, "PRIMA: Passive Reduced-Order Interconnect Macromodeling," IEEE Trans. on CAD, vol. 17, pp. 645-654 Aug. 1998.

* cited by examiner

502

```
dfs_search_noinout(node)
{
    stop_flag=1;
    for(i=0,child=node->child;i<node-
>NoOfChild;i++,child=child->next){
      /*child belong to SCC, search from SCC's
outputs, do the same, no need to repeat here*/
      if((!IsVdd(node))&&(!IsGnd(node))){
        continue;
      }
      else{
        xx=dfs_search_noinout(node);
        if(xx==0){
          stop_flag=0;
        }
      }
    }
    if(IsRlcInputOut(node)){
      node->stop_flag=0;
    }
    else if(stop_flag==1){
      node->stop_flag=0;
    }
    else{
        rn->stop_flag=0;
        return 0;
    }
    return(node->stop_flag);
```

```
GenerateOuputCone()
{
  for(i=0;i<NoOfOutnode;i++){
    queue(outnode[i]);
  }
  while(queue_not_empty){
    node=top_of_queue();
    dequeue(node);node->flag=1;
    parent=parent(node);
    if(parent->scc==NULL){
      for(i=0;i<parent->NoOfChild;i++){
        if(parent->child[i]->flag==1) cnt++;
      }
      if(cnt==parent->NoOfChild) queue(parent);
    }
    else{
      xx=0;
      for(i=0;i<parent->scc->NoOfOut;i++){
        for(j=0;j<parent->scc->out[i]->NoOfChild;j++){
          xx+= parent->scc->out[i]->NoOfChild;
          if(parent->scc->out[i]->child[j]->flag==1)
          cnt++;
        }
      }
      if(cnt==xx) queue(parent->scc->in[0]);
    }
  }
  for(i=0;i<NoOfOutnodes;i++){
    dft_coneroot(outnode[i]);
  }
}
dft_oneroot(node)
{
  if(node->parent!=NULL&&node->parent->flag==1){
    dft_oneroot(node->parent);
  }
  else{
    ConeRoot[coneroot_cnt++]=node;
  }
}
```

```
dfs_search()
{
  for(i=0;i<node->NoOfChild;i++){
    If(node->child[i]->stop_flag==0) realfanout++;
  }
  while(iter<2){
    if(iter==1&&realfanout>1){ /*splitiing occurs so so
solver right away and start new parti*/
       putparti2solver(rlc);
       PartiPowerElemCnt=0;
    }
    For(i=0;i<node->NoOfChild;i++){
       if(node->child[i]->stop_flag==1&&iter==0){
         PartiRlc[PartiPowerElemCnt++]=celem;
         dfs_search_noinout(node->scc->child[i]);
       }
       else if(node->child[i]->scc!NULL&&iter==1){
         /*put scc into partirlc*/
         PartiRlc[PartiPowerElemCnt++]=celem;
         putparti2solver();
         PartiPowerElemCnt=0;
         for(j=0;j<node->child[i]->scc->NoOfElem;j++){
            PartiRlc[PartiPowerElemCnt++]=node->child[i]-
>scc->elem[j];
         }
         putparti2solver();
         PartiPowerElemCnt=0;
         For(j=0;j<node->child[i]->scc->noout;j++){
            dfs_search(node->child[i]->scc->out[j]);
         }
       else if(iter==1){
         PartiRlc[PartiPowerElemCnt++]=celem;
         dfs_search(node);
       }
     }
     iter++;
   }
   if(realfanout==0&&PartiPowerElemCnt>0){ /* means
leaf elem reached*/
      putparti2solver(rlc);
   }
   return;
}
```

FIG. 8

Partition 1 :   2 resistors    2 nodes   25, 28
Partition 2 :   8 resistors    7 nodes   6, 29-34
Partition 3 :   1 resistor     2 nodes   1, Vdd
Partition 4 :   7 resistors    5 nodes   1-4, 35
Partition 5 :   2 resistors    3 nodes   5, 6, 35
Partition 6 :   1 resistor     2 nodes   6, 7
Partition 7 :   4 resistors    5 nodes   7-9, 21-22
Partition 8 :   2 resistors    2 nodes   2, Vdd
Partition 9 :   1 resistor     2 nodes   7, 23
Partition 10 :  5 resistors    4 nodes   30-32, 34
Partition 11 :  1 resistor     2 nodes   20, 24
Partition 12 :  3 resistors    2 nodes   20, 26
Partition 13 :  12 resistors   6 nodes   15-19, 26
Partition 14 :  4 resistors    3 nodes   10-11, Vdd
Partition 15 :  1 resistor     2 nodes   2, Vdd

1001 — Determining the number of inputs N of the each partition
 N = B + I
 B is number of boundary nodes between the said partition and other partitions
 I is number of power network inputs inside the said partition

1002 — Determining the number of outputs M of the said each partition as being the number of outputs of power inside the said partition

1003 — Calculating NxN admittance matrix and MxN voltage transfer for the said partition using AWE and model reduced ordering methods to generate results in pole residue format

FIG. 10

Partition number 1 with 1 input and 1 output 1

```
*Partition 1 consist of 2 elems
* x1_spef.R43(43)
* x1_spef.R51(51)
* x1_spef.vdd:25(32) cap=4.0000e-013
* x1_spef.vdd:28(35) cap=1.0000e-013
* x3:a1(6) cap=3.0000e-013
g1 x1_spef.vdd:25 0 pole_residue
x1_spef.vdd:25 0
+ pole 2 -5.1994e+010 -3.5617e+009
+ [0,0] 3.3333e-003 4.0000e-013 -1.0654e+008
-4.5743e+006
e1 x1_spef.vdd:25 0 pole_residue x3:a1 0
+ [0,0] -3.8236e+009 3.8236e+009
```

108

1201 — Formulating the problem in terms of nodal analysis

1202 — Expressing current in frequency domain at boundary nodes of each partition of the circuit as $I(s)=A(s)V(s)+I_0$ where $A(s)$ is NxN the admittance matrix with each matrix element $A_{mn}(s)$ being expressed by $$A_{mn}(s) = a_{mn} + b_{mn} s + \sum_{i=1}^{k} \frac{d_{i,mn}}{(s+c_{i,mn})}$$

$$I_{0,m} = V_{init} \sum_{n=1}^{N} \left( -b_{mn} + \sum_{i=1}^{k} \frac{d_{i,mn}/c_{i,mn}}{(s+c_{i,mn})} \right) \quad V_{init}$$

is initial value at the boundary nodes

1203 — Using convolution to evaluate $F(t) = L^{-1}\left(\frac{d}{(s+c)} V(s)\right)$ and update $F(t + \Delta t)$ as follows, $$F(t + \Delta t) = F(t) \frac{1 - \Delta t\, c/2}{1 + \Delta t\, c/2} + \frac{\Delta t\, d/2}{1 + \Delta t\, c/2} \left( V(t + \Delta t) + V(t) \right)$$

FIG. 12

1301 expressing voltage in frequency domain at M output nodes and N input nodes of each partition of the circuit as $V_{out}(s)=T(s)V_{in}(s)+I_0$ where $T(s)$ is $M\times N$ the voltage transfer matrix with each matrix element $A_{mn}(s)$ being expressed by $$T_{mn}(s) = a_{mn} + \sum_{i=1}^{k} \frac{d_{i,mn}}{(s+c_{i,mn})}$$

$$I_{0,m} = V_{init} \sum_{n=1}^{N} \left( \sum_{i=1}^{k} \frac{d_{i,mn}/c_{i,mn}}{(s+c_{i,mn})} \right)$$

$V_{init}$ is initial value at the output nodes;

1302 computing voltage at the said M output nodes utilizing the voltage transfer matrix at the time step after obtaining voltage at the said N input nodes;

1303 using convolution to evaluate $W(t) = L^{-1}\left(\frac{d}{(s+c)}V(s)\right)$ and update $W(t+\Delta t)$ as follows, $$W(t+\Delta t) = W(t)\frac{1-\Delta t\, c/2}{1+\Delta t\, c/2} + \frac{\Delta t\, d/2}{1+\Delta t\, c/2}(V(t+\Delta t)+V(t))$$

FIG. 13

POWER NETWORK REDUCTION AND SIMULATION IN TIME AND FREQUENCY DOMAINS TO CALCULATE VOLTAGE DROP

FIELD OF THE INVENTION

The present invention relates to integrated circuit design, and more particularly to a design timing verification tool that is capable of handling the calculation of voltage drop of power network at contact points with given currents at these points.

BACKGROUND OF THE INVENTION

In today's nanometer circuit design, it is almost standard practice by including power network in the timing simulation or timing analysis. Due to complexity in combining circuit and power network in calculating voltage drop or surge is very cumbersome. Very often the two-stage approach, namely the first stage of calculating power currents at the contact points, and the second stage in obtaining voltage drop by utilizing the said power currents injected into the power network through the said contact points, is adopted. As to the second stage in evaluating the voltage drop, it can be very CPU intensive to run circuit simulation on extremely large power network. Therefore, how to solve power network efficiently poses a challenging task.

It is well-known that the traditional spice-in-spice-out approach based on RC reduction method which reduces the original power network into a smaller circuit still in spice format has been adopted for quite a few years. The beauty of this approach is that it does reduce the power network and the reduced circuit in spice format can be immediately accepted by any timing simulator without any change of existing simulation engine. However, there are several deficiencies. First, in this spice-in-spice-out approach some internal nodes of power network in some cases may need to be saved for other purposes, but they turn out to be deleted after RC reduction. Secondly, there is an accuracy issue. RC reduction most often reduce a line of resistors into a single one with sensible resistance and capacitance values. If the size of sub-networks tends to be large, the accuracy may be degraded. Thirdly, to achieve better partition result, the partition size should be as large as possible without increasing the number of internal nodes of the reduced power network. However, large sub-network with many ports are not possible to be reduced into a simple circuit.

This invention proposes a novel method to reduce power network by saving the specified nodes with minimal performance penalty based on admittance matrix and voltage transfer in frequency domain calculated by using well-known methods such as AWE (asymptotic waveform expansion) and reduced ordering methods. It is worthwhile to point out that interconnect for power network is treated quite differently from the routing signals. The reason is that routing signals tend to have one or several inputs in case of cross-talk, while power network has a huge number of inputs which are the contacts of power network. Therefore, it is not possible to calculate the extremely large admittance matrix since matrix size is the same as the huge number of inputs of power network. The concept of partitioning the power network has been quite well-known for years. However, to generate sensible RC reduced circuit, namely, both resistance and capacitance are positive numbers, still the lowest order in frequency domain is adopted, meaning each partition of the whole power network must be small in order to preserve accuracy. Note that by means of reduced ordering approach through congruence transformation the reduced circuit may be generated, but with wildly negative capacitance and resistance. Besides, by saving some internal nodes the partition result can be affected.

With all of the deficiencies as stated above for the traditional approach this invention proposes novel approach in three steps to solve voltage drop of power network in an efficient approach without compromise of accuracy. The first part lies in the step of partitioning the power network by recognizing its inputs and outputs. While decomposing the circuit into tree structure with strongly connected components (SCC) can be found in any standard textbook, the actual implementation involves the algorithms to enlarge partition size without increasing the number of nodes for the reduced power network. These algorithms include identifying output network with one input and outputs and sub-network without input and output and regardless of any resistor connected to power source. The second step deals with the calculation of admittance matrix for the inputs of each sub-network after partition, plus voltage transfer by treating specified nodes to be saved as output nodes in the sub-network, without the need to transform these said admittance matrix and voltage transfer into an equivalent circuit with positive resistance and capacitance values, the step of which in some cases is impossible to be achieved. Finally the third step is to perform timing simulation in time and frequency domain by integrating the reduced power network in frequency domain in terms of admittance matrix and voltage transfer into circuit in time domain. In this invention the timing simulation engine is enhanced to handle both admittance matrix and voltage transfer in the same simulation engine at each time step with very minimal overhead in CPU.

SUMMARY OF THE INVENTION

This invention provides a method for performing voltage drop calculation at the contact points in the power network with known injected power currents at the said contact points, consisting of partitioning the said power network into sub-networks which are expressed in terms of admittance matrix associated with inputs of all sub-networks and voltage transfer functions between inputs and outputs of all sub-networks, and running timing simulation in both timing and frequency domain to get voltages at the said contact points.

According to another aspect, a voltage drop calculation tool according to the invention provides a method of saving user assigned nodes for reporting voltages, identifying inputs and outputs and voltage source of power network and partitioning the said power network utilizing the said user assigned nodes, input and output nodes, and voltage source.

According to another aspect, a voltage drop calculation tool according to the invention provides a method of partitioning the said power network utilizing the said user assigned nodes, input and output nodes, and voltage source including expressing power network in terms of tree structure with SCC, absorbing sub-tree without input and output regardless of voltage source into the parent node of the said sub-tree, identifying output sub-network with single input and outputs inside power network and remaining parts being partitioned into sub-network with inputs only and following depth first traversal of the power network to generate each partition.

According to another aspect, a voltage drop calculation tool according to the invention provides a method of absorbing sub-tree without input and output regardless of voltage source into the parent node of the said sub-tree including carrying out depth first traversal recursively to flag node in the sub-network without input and output regardless of voltage source.

According to another aspect, a voltage drop calculation tool according to the invention provides a method of identifying output sub-network with single input and outputs including (1) using breadth first traversal by initially putting output nodes into queue; and (2) processing node from queue by flagging the said node and (a) putting its parent node into queue if the children of the said parent not including those flagged as being in sub-tree without inputs and outputs have been de-queued (b) checking if the said parent node is output of SCC and if so, checking if children of the outputs nodes of the said SCC not including those flagged as being in sub-tree without inputs and outputs have been de-queued, and if so putting input of the said SCC into queue; and (3) finding initial cone root by traversing from output nodes inside output cone to find the parent of the node without being flagged as output cone.

According to another aspect, a voltage drop calculation tool according to the invention provides a method of following depth first traversal of the power network to generate each partition including (a) obtaining the number of fanout of each node during the process of depth first traversal not counting the one inside subtree without input and outputs and SCC being considered as one fanout, (b) absorbing subtree without input and outputs for the adjacent nodes of the said node in the said process of depth first traversal, (c) reporting all elements in stack up to the said node in one partition, and searching from the adjacent node of the said node to generate new partition if the said fanout is greater than 1, (d) adding adjacent element into stack up to the said node and searching from the adjacent node of the said node to continue the same partition if the said fanout is 1, and (e) reaching adjacent node of the said node belonging to SCC and putting the said SCC into new partition and continuing searching new partition from the boundary nodes of the said SCC other than the said node.

According to another aspect, a voltage drop calculation tool according to the invention provides a method of expressing the said sub-networks by admittance matrix and voltage transfer in frequency domain including (a) determining the number N of inputs and M of outputs of each the said sub-networks and (b) calculating its N×N admittance matrix and M×N voltage transfer adopting both reduced order modeling and AWE (Asymptotic Waveform Expansion) methods.

According to another aspect, a voltage drop calculation tool according to the invention provides a method of running timing simulation in both time and frequency domain including (a) formulating the problem in terms of nodal analysis and (b) expressing current in frequency domain at boundary nodes of each partition of the circuit as $I(s)=A(s)V(s)+I_0$ where $A(s)$ is N×N the admittance matrix with each matrix element $A_{mn}(s)$ being expressed by $$A_{mn}(s) = a_{mn} + b_{mn}s + \sum_{i=1}^{k} \frac{d_{i,mn}}{(s+c_{i,mn})}$$

$$I_{0,m} = V_{init} \sum_{n=1}^{N} \left( -b_{mn} + \sum_{i=1}^{k} \frac{d_{i\_mn}/c_{i,mn}}{(s+c_{i,mn})} \right)$$

$V_{init}$ is initial value at the boundary nodes

According to another aspect, a voltage drop calculation tool according to the invention provides a method of expressing current in frequency including using convolution to evaluate $$F(t) = L^{-1}\left( \frac{d}{(s+c)} V(s) \right)$$

and update $F(t+\Delta t)$ as follows, $$F(t+\Delta t) = F(t)\frac{1-\Delta tc/2}{1+\Delta tc/2} + \frac{\Delta td/2}{1+\Delta tc/2}(V(t+\Delta t)+V(t))$$

According to another aspect, a voltage drop calculation tool according to the invention provides a method of running timing simulation in both time and frequency domain including (a) expressing output voltage in frequency domain at M output nodes and N input nodes of each partition of the circuit as $V_{out}(s)=T(s)V_{in}(s)+I_0$ where $T(s)$ is M×N the voltage transfer matrix with each matrix element $A_{mn}(s)$ being expressed by $$A_{mn}(s) = a_{mn} + \sum_{i=1}^{k} \frac{d_{i,mn}}{(s+c_{i,mn})}$$

$$I_{0,m} = V_{init} \sum_{n=1}^{N} \left( \sum_{i=1}^{k} \frac{d_{i\_mn}/c_{i,mn}}{(s+c_{i,mn})} \right)$$

$V_{init}$ is initial value at the output nodes;

and (b) computing voltage at the said M output nodes utilizing the voltage transfer function at the time step after obtaining voltage at the said N input nodes.

According to another aspect, a voltage drop calculation tool according to the invention provides a method of including using convolution to evaluate $$W(t) = L^{-1}\left( \frac{d}{(s+c)} V(s) \right)$$

and update $W(t+\Delta t)$ as follows, $$W(t+\Delta t) = W(t)\frac{1-\Delta tc/2}{1+\Delta tc/2} + \frac{\Delta td/2}{1+\Delta tc/2}(V(t+\Delta t)+V(t))$$

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 6 illustrates the algorithm absorbing subtree containing voltage source into the parent node of the said subtree;

FIG. 7 illustrates the algorithm identifying output sub-network with single input and outputs inside power network;

FIG. 8 illustrates the algorithm depth first traversal of the power network to generate each partition;

FIG. 9 is an example showing the partitions in terms of node and resistor numbers;

FIG. 10 is a block diagram illustrating generating voltage transfer and admittance matrix for each sub-network according to the present invention;

FIG. 12 is a block diagram illustrating the calculation of the voltages for inputs of all partitions inside the power network by running timing simulation in both time and frequency domain according to the present invention;

FIG. 13 is a block diagram illustrating the calculation of the voltages for outputs of all partitions inside the power network by running timing simulation in both time and frequency domain according to the present invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

As set forth above, the issue of calculating voltage drop in the presence of timing simulation and timing analysis has been widely addressed. Due to complexity of power network, it is generally accepted that two-stage approach is adopted by first approximating the power currents being injected into the power network at the contact points without considering power network and secondly calculating voltage drop at the said contact points by utilizing the said power currents. As to the calculation of voltage drop in the said second stage, traditional method is to generate reduced power network and to run circuit simulation on the said reduced power network.

Figure 1:
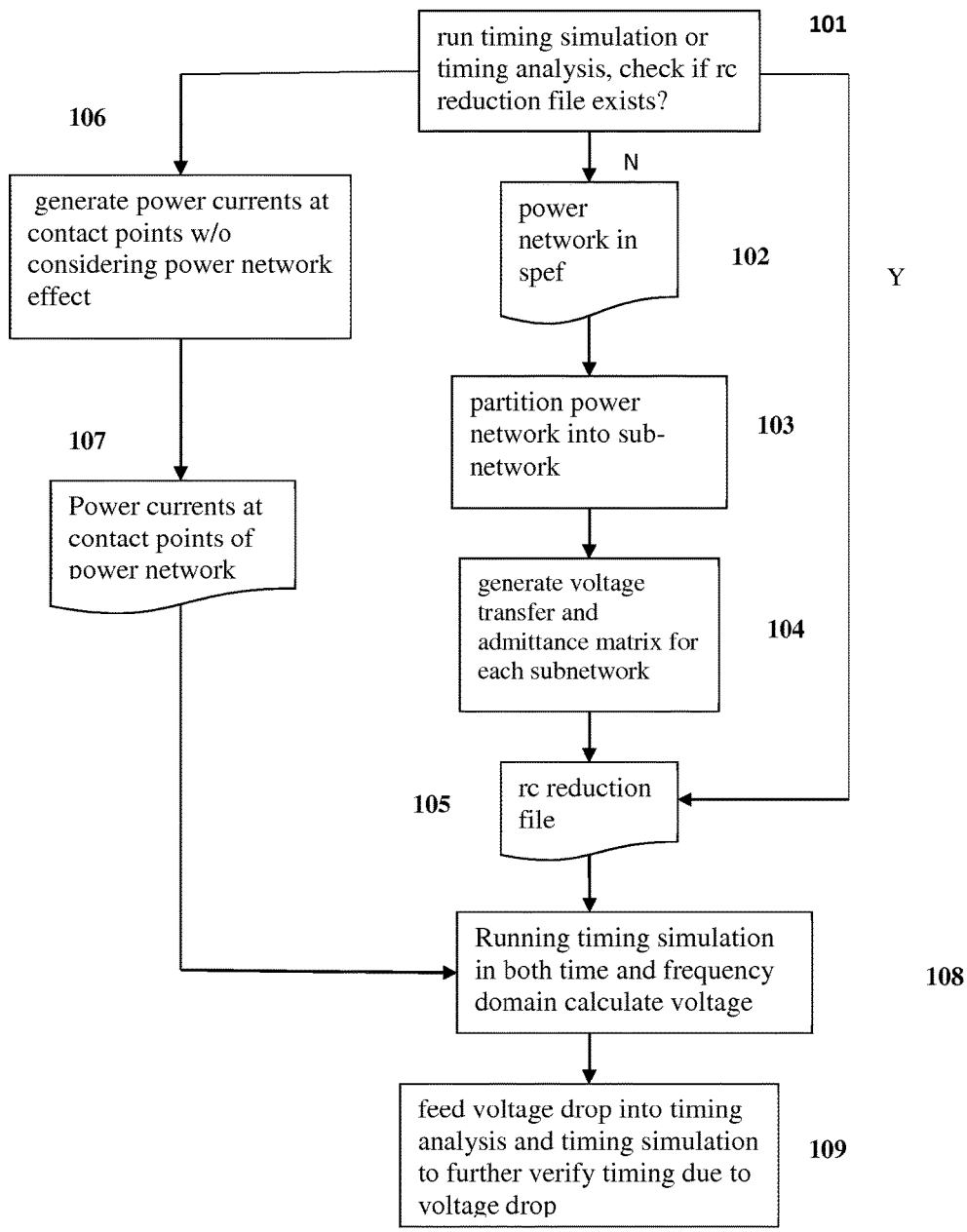
FIG. 1 is a block diagram illustrating power network reduction and simulation in time and frequency domains to calculate voltage drop according to the present invention.

In stark contrast, as shown in FIG. 1, according to an aspect of the invention, a method of calculating voltage drop implemented into static timing analysis and simulation tool is presented. In running the tool of timing analysis or timing simulation, a check is made as to whether the RC reduction file exists initially 101. If not, the original power network which in most cases is expressed in SPEF format is used 102. Then, the said power network is partitioned 103 and by making use of the inputs and outputs of each sub-network the voltage transfer and admittance matrix for the said sub-network are calculated 104. The results go to the RC reduction file 105 which can be used directly in the later runs without being re-generated. In order to calculate the voltage drop at the contact points, the power currents are obtained by the said timing analysis or timing simulation tool 106 107. After both power currents at contact points and voltage transfer and admittance matrix are in place, the voltage drop at contact points are calculated in both frequency and timing domains 108. Finally, the voltage drop information is fed back timing simulation or timing analysis for further timing verification 109.

Figure 2:
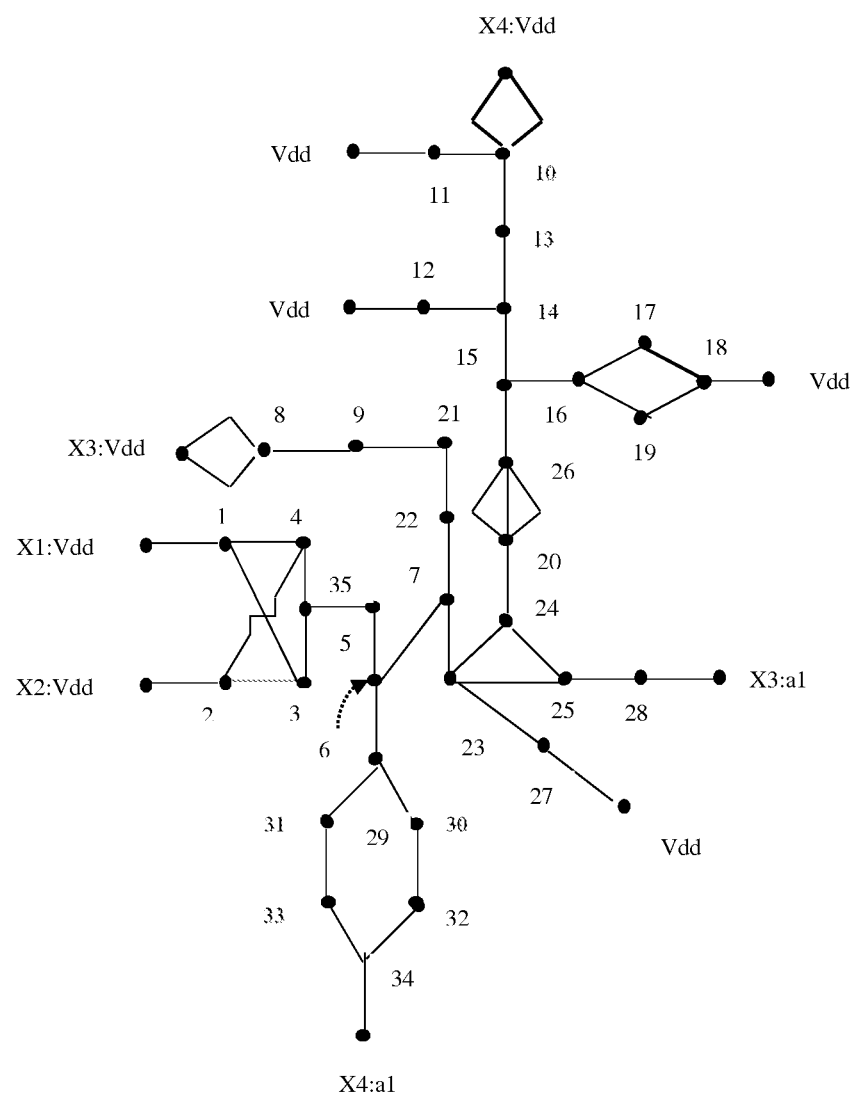
FIG. 2 is an example circuit for illustrating power network reduction and simulation in time and frequency domains to calculate voltage drop according to the present invention.
Figure 3:
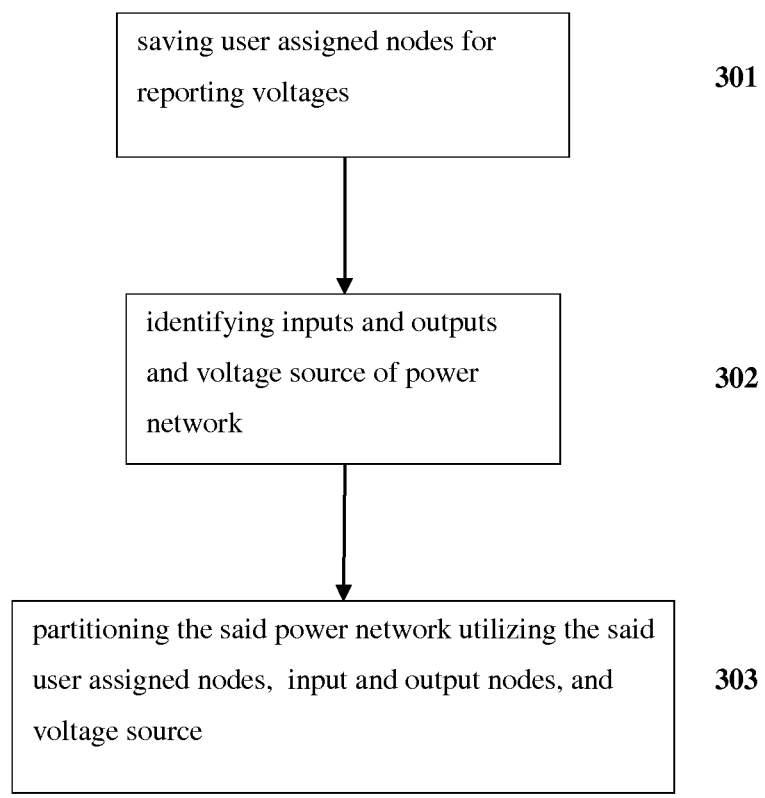
FIG. 3 is a flow chart illustrating power network being partitioned into sub-network according to the present invention.

FIG. 2 is a sample power network 102 used to illustrate various algorithms in this invention. According to one aspect of the invention, FIG. 3 shows the preliminary work prior to the partitioning 102. First, user specifies some internal nodes of the power network for reporting voltages and these nodes will be recorded and used in partitioning 301. Besides, the inputs and outputs of the said power network are identified 302 used in the partitioning 303.

Figure 4:
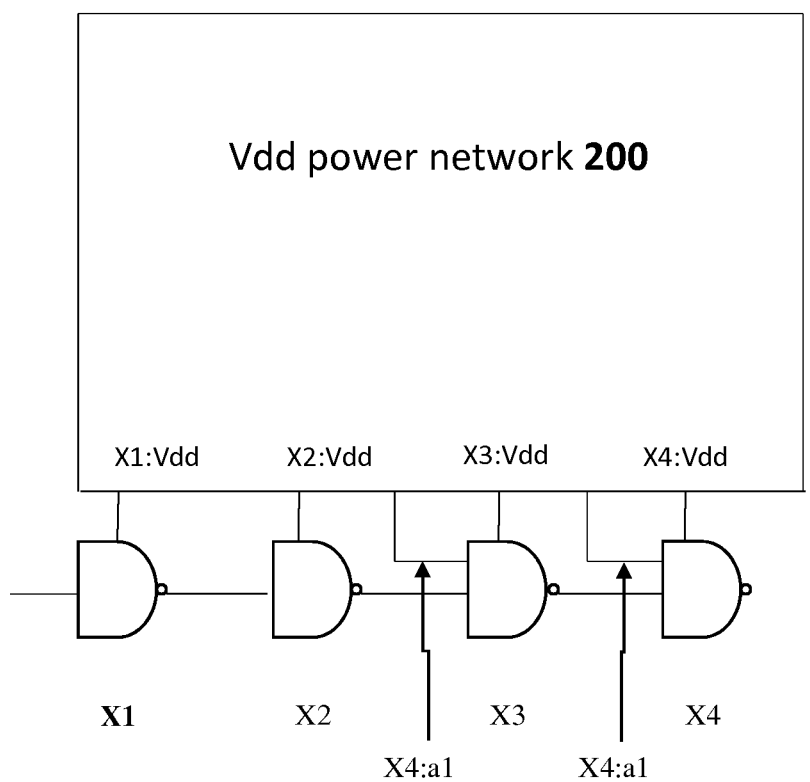
FIG. 4 illustrates the inputs and outputs of an example power network.

As shown in FIG. 4 the said power network 102 is connected to a circuit in which the nodes inside the power network connected to the Vdd port of each instance expressed as X1:Vdd, X2:Vdd, X3:Vdd, and X4:Vdd, respectively, are considered as inputs of the said power network, and the nodes X3:a1 and X4:a1 being connected to the gate of instances X3 and X4, respectively, are classified as output nodes of the said network. As to node, say 27, it is user assigned node with its voltage being reported during simulation, then node 27 is also treated as output node of the said power network. To simplify notation and presentation, we assume that the user specified node is X3:a1 which is also the output node of the said power network.

Figure 5:
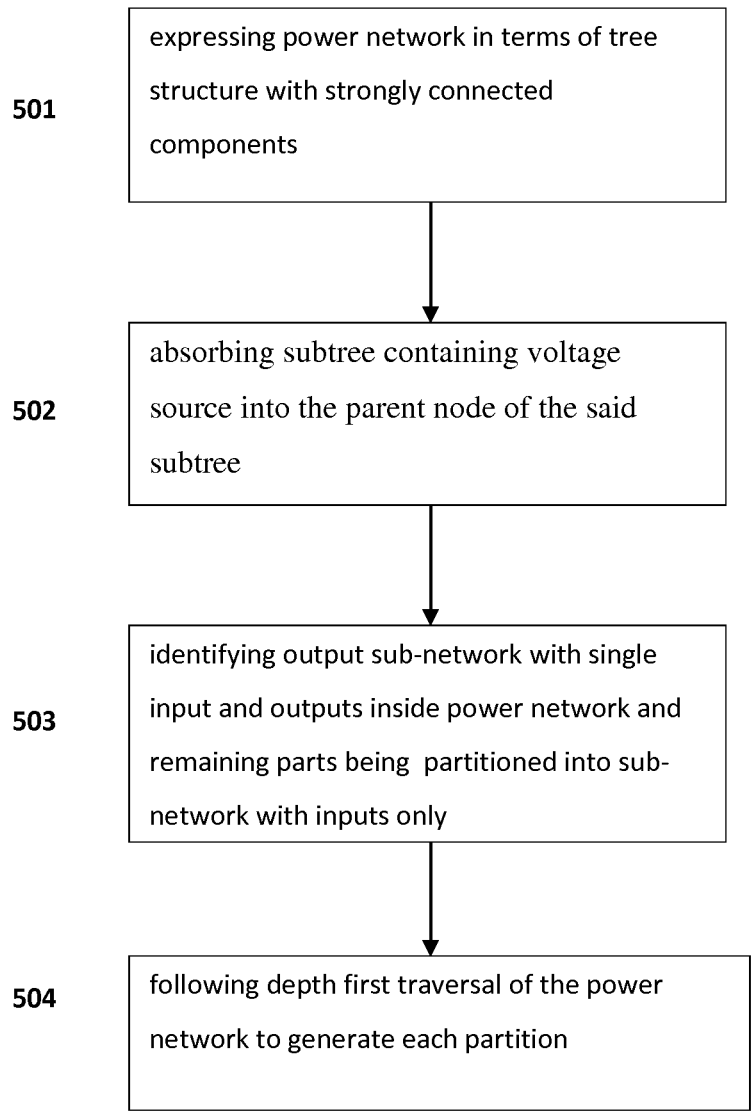
FIG. 5 is a block diagram illustrating partitioning the power network utilizing the user assigned nodes, input and output nodes, and voltage source according to the present invention.

The concept of partitioning with input and outputs is explained in the flowchart of FIG. 5 by referring to FIG. 2. In standard practice the power network is decomposed into a tree structure with SCC 501. As can be seen in FIG. 2, those SCCs are embedded into tree structure. For example, nodes 16, 17, 18, and 19 form an SCC, so is another SCC consisting of nodes from node 29 to node 34. Note that this step of decomposing the said power network into tree structure with SCC has nothing to do with input and output of the said power network. The purpose of the partition is to find as large the size of the sub-network as possible with as small the number of ports of the said sub-network as possible. Therefore, any sub-network without input and output of the said power network should be in the same sub-network, meaning this said sub-network is absorbed into the parent node of the said sub-network 502. This said sub-network may contain Vdd node. Referring back to FIG. 2, the fact that the two elements with nodes 10, 11, and Vdd being absorbed into parent node 10, means that the said nodes 10 an 11 will be in the same sub-network as that of node 10. Furthermore, to increase the partition size for the sub-network, an output cone having only one input and with one or several outputs can be identified as one sub-network 503. Again, as shown in FIG. 2, the output node of the said power network X4:a1 and internal nodes 6 and 29-34 form an output sub-network or an output cone in which node 6 is the only node connecting to the other sub-network and considered to be the only input of the said sub-network consisting of nodes 6 and 29-34. After all of these sub-networks without input and output of the power network and output sub-networks or cones have been identified, a depth first traversal is taken to partition the power network into sub-networks 504.

The algorithm of generating the sub-network without input and output of the power network based on depth first traversal 502 is described in FIG. 6. The procedure is done recursively to obtain the said sub-network ensuring every child of the node inside the said sub-network has no input and output regardless of Vdd connected to any element of the said sub-network. In depth first traversal a node inside SCC may be reached. It is straightforward to get boundary nodes of the said SCC other than the input of SCC in the process of traversal, and keep searching from those said boundary nodes.

As to the algorithm of identifying output sub-network with single input and outputs 503, it is as shown in FIG. 7. The breadth first traversal is used. Referring back to FIG. 2, X4:a1 and X3:a1 are initially put into queue. When processing the node, say X3:a1 from top of the queue, the node is de-queued and the node is flagged. Then, examine the parent of X3:a1, namely node 28, by checking all the children of the said node 28 to see if the de-queue flag has been set for all of the said children. If so, then the said node 28 is put into queue. When processing the $2^{nd}$ node in queue, namely node X4:a1, its parent node 34 is the output node of a SCC consisting of nodes 29-34. For SCC, we need to check the children for each of the outputs of the said SCC to ensure they all are flagged as being de-queued. Then, we can put the input of the said SCC into queue and keep the process until the said queue is empty. Once the nodes inside output sub-network have been identified, the next step is to find the root of the output cone. Starting from the output node of the power network, get the parent node of the said output node. Knowing the said parent node is flagged as output cone, then keep searching from the said parent node recursively until we reach a node with its parent node not being flagged as output sub-network, then this said parent node is recorded as the root of the sub-network.

The procedure for following depth first traversal of the power network to generate each partition 504 is presented in FIG. 8, still referring to FIG. 2. The process can start from any node of power network and the said node then is the root of the said power network as shown in FIG. 2. Here we select the node X4:Vdd which is located inside a SCC. Since SCC is treated as one partition, so in this case the starting node is the output node of SCC, namely nodes 10. The basic idea is that a line of resistors forms one partition. Thus, in path tracing if a splitting point is reached then a new partition will be formed. Here we start with node 10 and check its number of children to be 1, meaning node 10 is not a splitting point. We process node 10 twice. The first iteration is to check if the child of node 10 is flagged as sub-network without input and output. Here the child of node 10 does not have sub-network without input and output, and in second iteration we place the element of the said child of the said node 10, then proceed to node 13 recursively. Similarly, the number of children of node 13 is 1 and its child, namely node 14, has a sub-network without input and output associated with it, as shown by the two resistors with two ends expressed by nodes 14, 12 and 12 and Vdd, respectively. Therefore, in iteration 1, these elements are absorbed into the same partition as that for element between nodes 13 and 14, and in the second iteration element between nodes 13 and 14 is put onto stack for the current partition. The same process goes to node 14, the same applies to its child node 15, including sub-network without input and output consisting of nodes 15-19 and resistor between node 18 and Vdd. When reaching node 16, its child node 26 belongs to a SCC. Therefore, we add the element between nodes 15 and 26 into current partition and the said SCC is treated as a new partition. Then, keep searching from output node of the said SCC, namely node 20, and carry out the same procedure for each node recursively. Note that when processing node 6, the child node 29 and nodes further down including 29-34 belong to the output cone containing one input and one output. This said output cone is identified prior to the process of depth first traversal in generating partitions. In the said depth first traversal in processing node 6, the search from its child 29 is not done again, since the said output cone including node 29 has already been identified. Instead, the search will be continued from the $2^{nd}$ child 5. After the partitioning is done, there are 15 partitions being generated as shown in FIG. 9.

Figure 11:
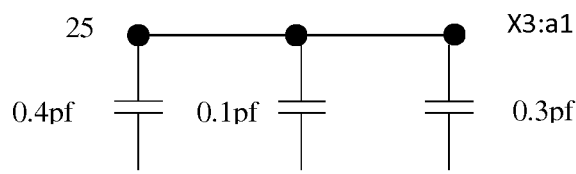
FIG. 11 is an example for one partition in terms of its admittance matrix for the input of the partition and its voltage transfer between the input and output of the said partition.

After each partition is done as presented in FIG. 9, the next step is to solve each partition as mentioned by putparti2solver( ) in FIG. 8 and its procedure is described in FIG. 10 by referring back to 104 in FIG. 1. First, we need to determine the total number of inputs N of the said each partition. The boundary nodes between the said partition and adjacent partitions are considered as inputs of the said partition regardless of the fact whether these said nodes are inputs or outputs of the said power network and the said number is, say B. Also, assume there are I inputs of the power network existing as internal nodes inside the said partition and these said I inputs are also treated as inputs of the said partition. Thus, we have N=B+I. As to the number of outputs of the said partition, it is determined by the number, say M, of outputs of the said power network, including user assigned nodes for recording voltage, which exist in the said power network. Then the next step in solving the said partition is to calculate the N×N admittance matrix and M×N voltage transfer with matrix elements in terms of pole residue format. This is done by the well-known methods of AWE (Asymptotic Waveform Expansion) and reduced order modeling and there is no need to review these methods here. A sample result for partition number 1 including one input and one output, namely node 25 and output node x3:a1 wherein the admittance matrix and voltage transfer are expressed by a G and E element in an output file for the partition results is as shown in FIG. 11. The initial value part for admittance matrix and voltage transfer which is not shown in FIG. 11 is considered when timing simulation is carried out.

According to one aspect of this invention, FIG. 12 shows how to feed this said partitioned power network in terms of admittance matrix and voltage transfer into timing simulation in both timing and frequency domains. The method is based on nodal analysis 1201. In purely timing domain, for RC circuit it is simple to formulate the problem in terms of conductance matrix for the resistors part and susceptibility matrix for capacitance and such as $$GV+C\,dv/dt=i(t)$$

Then, it can be solved straightforwardly using either backward Euler integration or trapezoidal rule of integration. Based on trapezoidal rule of integration we obtain $$\frac{V(t+\Delta t)-V(t)}{\Delta t} = \frac{1}{2}(V'(t+\Delta t)+V'(t))$$

$$\left(G+\frac{2C}{\Delta t}\right)V(t+\Delta t) = \left(\frac{2C}{\Delta t}V(t)+CV'(t)+i(t+\Delta t)\right)$$

Then, $V(t+\Delta t)$ is obtained by using the known right hand side and LU decomposition of $$\left(G+\frac{2C}{\Delta t}\right).$$

For the frequency domain, all the admittance matrix for each partition are fitted into the above equation in quite different manner from the timing domain. Referring to FIG. 2 for the sample power network, we use node 6 for illustration purpose. There are 3 partitions, namely partitions 2, 5 and 6, connecting to the said node 6. Assuming I(2,6), I(5,6) and I(6,6) representing the currents flowing into the said partition 2, 5, and 6 from the said node 6, we have $$I(2,6)+I(5,6)+I(6,6)=i(6)$$

Here i(6) is the external current at node 6. In case the grounded capacitance at node is absorbed into any partition in calculating admittance matrix and there is no external current source at the said node 6, then obviously i(6) is zero. The purpose is to transform these currents into quantities in terms of voltage at the boundary nodes of each partition by using admittance matrix. The general form of admittance matrix with initial condition is written down in FIG. 12 1202. Note that the initial value part $I_0$,m is obtained from $A_{mn}(s)$ with $sV(s)$ being replaced by $sV(s)-V_{init}$ and sum with respect to n from 1 to N and mn refers to mth row and nth column element of the matrix A(s). In the above example in calculating I(2,6) we use the notation A as being admittance matrix for partition 2, and voltage as vector with $1^{st}$ element for boundary node 6 and $2^{nd}$ element for another boundary node for partition 2, namely node 5. We therefore have $$I(2,6)=L^{-1}(A_{11}V_1(s)+A_{12}V_2(s)+I_{0,1}(s))$$

where $L^{-1}$ is the inverse Laplace transform and $V_1(s)$ and $V_2(s)$ refer to node voltages for node 6 and 5, respectively. The same is done for I(5,60) and I(6,6) generating voltages for nodes 6, 5, 7, and 29. For brevity of notation, we save all the indices in admittance matrix. In calculating $L^{-1}$ ($A_{11}$ $V_1(s)$) the constant term $L^{-1}$ (a $V_1(s)$) gives $aV_1(t)$. The linear term $L^{-1}$ (bs $V_1(s)$)–$bV_i$ becomes $dV_1(t)/dt$ and this term contributes to the susceptibility matrix. More elaboration is given to $$L^{-1}\left(\left(\frac{d}{(s+c)}V(s)\right)\right)$$

1203. Here we derive the formula based on trapezoidal rule integration although the same discussion can be easily applied to backward Euler integration.

$$F(t)=L^{-1}\left(\left(\frac{d}{(s+c)}V(s)\right)\right)=de^{-ct}\int_0^t e^{cx}V(x)dx$$

$$\frac{F(t+\Delta t)-F(t)}{\Delta t}=\frac{1}{2}(F'(t+\Delta t)+F'(t))$$

$$F(t+\Delta t)=F(t)\frac{1-\Delta tc/2}{1+\Delta tc/2}+\frac{\Delta td/2}{1+\Delta tc/2}(V(t+\Delta t)+V(t))$$

Therefore, we can understand that in handling frequency domain the use inverse Laplace transform to get $F(t+\Delta t)$ which has contribution of $V(t+\Delta t)$ which needs to be integrated into the G matrix on the left hand side of the aforementioned formula in solving $V(t+\Delta t)$ and terms such as V(t) and F(t) are added up to the left hand side of the said formula in solving for $V(t+\Delta t)$. Besides, F(t) is updated recursively. For example once $V(t+\Delta t)$ is done, then $F(t+\Delta t)$ is updated using the above formula using the known values from F(t), $V(t+\Delta t)$ and V(t). This process is iterated until the simulation stops and final V(t) is obtained at the inputs of all the partitions in the power network.

According to one aspect of the invention, FIG. 13 shows the flowchart in calculating voltages at the output nodes of partitioned power network using voltage transfer matrix. First, voltage transfer matrix in terms of pole residue format has been generated. Similar to the admittance matrix, the initial value part $I_{0,m}$ is obtained from $T_{mn}(s)$ by sV(s) by $sV(s)-V_{init}$ and sum $T_{mn}(s)$ with respect to n from 1 to N and mn refers to mth row and nth column element of the matrix T 1301. The beauty of this algorithm in calculating output voltage is that it is integrated into the calculation of input voltage using admittance matrix, incurring very minimal CPU penalty. The concept is that during simulation at each time step the voltage at input of the partition is evaluated first. Then, using the voltage transfer and the known input voltage the output at the same time step is evaluated 1302. By doing this way, it's easy to understand why this method runs efficiently. Here we separate out the output nodes from input nodes instead of treating all of them as input nodes. Therefore, for the entire partitioned power network, the total number of nodes becomes less if output nodes are considered separately. Thus, this algorithm achieves CPU savings. As to the valuation of output node voltages by means of input nodes of all partitions and the voltage transfers for those partitions, the overhead in rather minimal. Similar to the case of admittance matrix, the inverse Laplace transform is used to voltage at output as a function of time. Referring to 1301 in FIG. 13, we have $$V_{out}(t)=L^{-1}(T(s)V_{in}(s)+I_0)$$

At time step $t+\Delta t$, the constant term $a_{mn}$ in T(s) $V_{in,n}$ (s) contributes to $a_{mn}$ $V_{in,n}$ ($t+\Delta t$) and $$L^{-1}(I_0)=V_{init}\sum_{n=1}^N \frac{d_{i,mn}}{c_{i,mn}}e^{-c_{i,mn}(t+\Delta t)}$$

Another term is $$W(t)=L^{-1}\left(\frac{d}{(s+c)}V(s)\right)$$

Using trapezoidal rule of integration, we achieve $$W(t+\Delta t)=W(t)\frac{1-\Delta tc/2}{1+\Delta tc/2}+\frac{\Delta td/2}{1+\Delta tc/2}(V(t+\Delta t)+V(t))$$

As previously discussed, $V(t+\Delta t)$ being the voltage of the input of all the partitions has already been calculated. Thus, it's rather direct to calculated $W(t+\Delta t)$ which then is used for next time step, say $t+2\Delta t$. The simulation is continued until there are no more events in the time step.

In conclusion, this invention presents an approach in calculating voltage drop at the contact points of the power network in stark contrast to the traditional method in which the said power network is partitioned into small partitions or sub-networks in spice format with reduced number of resistors and capacitors and any timing simulator handling spice simulation can accept this said spice circuit with RC reduction without any change of the simulator engine itself. This invention consists of the combination of three steps, namely first partitioning the said power network into sub-networks, secondly expressing the sub-network with its input and outputs in terms admittance matrix for inputs and voltage transfer function from inputs to outputs of each sub-network, and thirdly feeding these aforementioned admittance and voltage transfer into timing simulator with its simulation engine modified to handle hybrid of time and frequency domain. This invention further proposes the partitioning algorithm which considers the inputs, outputs and user assigned nodes in both absorbing sub-network without input and output regardless of any resistor being connected to Vdd into its parent node of the said sub-network and generating output cone with one single input and outputs including user assigned nodes for the purpose of achieving even better reduction result. These facts render the well-known spice in and spice out procedure futile. As to the simulation engine for both time and frequency domain, the nodal approach and convolution to get voltage at boundary nodes using admittance matrix are used. Besides, output voltage is directly calculated from input for each sub-network with very minimal CPU penalty by means of voltage transfer at each time step during the process of timing simulation with very minimal CPU penalty. The voltage drop information being obtained after simulation is done is then used by timing analysis or timing simulation for further timing verification.

The invention claimed is:

1. A computer-implemented method for performing calculation of voltage drop and surge of power network in an integrated circuit at contact points where power currents are injected into power network, comprising the computer implemented steps of:
    storing integrated circuit connectivity information with power network extracted from layout of integrated circuit in the computer system;
    identifying power network from the integrated circuit stored in the computer system;
    partitioning the power network into sub-networks, wherein the step of partitioning power network into sub-networks comprising:
    expressing power network in terms of tree structure with strongly connected components (SCC);
    absorbing sub-tree without input and output regardless of voltage source into parent node of the sub-tree;
    identifying output sub-network with single input and outputs inside power network and remaining parts being partitioned into sub-network with inputs only, wherein the step of identifying output sub-network with single input and outputs, comprising the computer implemented steps of: using breadth first traversal by initially putting output nodes into queue; and processing node from queue by flagging the said node and (a)putting its parent node into queue if the children of the said parent not including those flagged as being in sub-tree without inputs and outputs have been de-queued (b)checking if the said parent node is output of SCC and if so, checking if children of the outputs nodes of the said SCC not including those flagged as being in sub-tree without inputs and outputs have been de-queued, and if so putting input of the said SCC into queue; and finding initial cone root by traversing from output nodes inside output cone to find the parent of the node without being flagged as output cone; and
    following depth first traversal of the power network to generate each partition;
    expressing the sub-networks by admittance matrix and voltage transfer in frequency domain;
    running timing simulation in both time and frequency domain on the power network by injecting the power currents at the contact points into the power network to calculate voltage drop at the contact points; and
    feeding voltage drop information back to timing analysis or timing simulation for further post-layout timing verification prior to fabrication.

2. A computer-implemented method according to claim 1, wherein the step of partitioning power network into sub-networks, comprising the computer implemented steps of:
    saving user assigned nodes for reporting voltages; and
    identifying inputs and outputs and voltage source of power network; and
    partitioning the power network utilizing the user assigned nodes, input and output nodes, and voltage source.

3. A computer-implemented method according to claim 1, wherein the step of absorbing sub-tree without input and output regardless of voltage source into the parent node of the sub-tree, comprising the computer implemented steps of:
    carrying out depth first traversal recursively to flag node in the sub-network without input and output regardless of voltage source.

4. A computer-implemented method according to claim 1, wherein the step of following depth first traversal of the power network to generate each partition, comprising the computer implemented steps of:
    obtaining number of fanout of each node with SCC being considered as one fanout during process of depth first traversal not counting both fanout inside subtree without power network inputs and outputs and fanout inside output cone; and
    absorbing subtree without input and outputs for adjacent nodes of the node in the adjacent nodes in the process of depth first traversal; and
    reporting all elements in the stack up to the node in one partition, and searching from adjacent node of the node to generate new partition if the fanout is greater than 1; and
    adding adjacent element into the stack up to the node and searching from adjacent node of the node to continue the same partition if the fanout is 1; and
    reaching adjacent node of the node belonging to SCC and putting the SCC into new partition and continuing searching new partition from boundary nodes of the SCC other than the node; and
    reporting each output cone as one partition.

5. A computer-implemented method according to claim 1, wherein the step of expressing the sub-networks by admittance matrix and voltage transfer in frequency, comprising the computer implemented steps of:
    determining number of inputs N of each partition as being the sum of B and I, wherein B is number of boundary nodes between the partition and other partitions regardless of the boundary nodes being outputs of power network and I is number of power network inputs inside the partition; and determining number of outputs M of each partition as being number of outputs of power network inside the partition; and calculating N×N admittance matrix and M×N voltage transfer for the partition by adopting both reduced order modeling and AWE (Asymptotic Waveform Expansion) methods.

6. A computer-implemented method according to claim 1, wherein the step of running timing simulation in both time and frequency domain, comprising the computer implemented steps of:

formulating problem of running timing simulation in both time and frequency domain in terms of nodal analysis;

expressing current in frequency domain at boundary nodes of each partition of the circuit as $I(s)=A(s)V(s)+I_0$ where $A(s)$ is N×N the admittance matrix with each matrix element $A_{mn}(s)$ being expressed by $$A_{mn}(s) = a_{mn} + b_{mn}s + \sum_{i=1}^{k} \frac{d_{i,mn}}{(s+c_{i,mn})}$$

$$I_{0,m} = V_{init} \sum_{n=1}^{N} \left( -b_{mn} + \sum_{i=1}^{k} \frac{d_{i,mn}/c_{i,mn}}{(s+c_{i,mn})} \right)$$

$V_{init}$ is initial value at boundary nodes of each partition of the circuit.

7. A computer-implemented method according to claim 6, wherein the step of expressing current in frequency, comprising the computer implemented steps of:

using convolution to evaluate $$F(t) = L^{-1}\left(\frac{d}{(s+c)}V(s)\right)$$

and update $F(t+\Delta t)$ as follows, $$F(t+\Delta t) = F(t)\frac{1-\Delta tc/2}{1+\Delta tc/2} + \frac{\Delta td/2}{1+\Delta tc/2}(V(t+\Delta t)+V(t)).$$

8. A computer-implemented method according to claim 1, wherein the step of running timing simulation in both time and frequency domain, comprising the computer implemented steps of:

expressing output voltage in frequency domain at M output nodes and N input nodes of each partition of circuit as $V_{out}(s)=T(s)V_{in}(s)+I_0$ where $T(s)$ is M×N voltage transfer matrix with each matrix element $A_{mn}(s)$ being expressed by $$A_{mn}(s) = a_{mn} + \sum_{i=1}^{k} \frac{d_{i,mn}}{(s+c_{i,mn})}$$

$$I_{0,m} = V_{init} \sum_{n=1}^{N} \left( \sum_{i=1}^{k} \frac{d_{i,mn}/c_{i,mn}}{(s+c_{i,mn})} \right)$$

$V_{init}$ is initial value at output nodes;

computing voltage at the M output nodes utilizing voltage transfer matrix at time step after obtaining voltage at the N input nodes.

9. A computer-implemented method according to claim 8, wherein the step of expressing output voltage in frequency, comprising the computer implemented steps of:

using convolution to evaluate $$W(t) = L^{-1}\left(\frac{d}{(s+c)}V(s)\right)$$

and update $W(t+\Delta t)$ as follows, $$W(t+\Delta t) = W(t)\frac{1-\Delta tc/2}{1+\Delta tc/2} + \frac{\Delta td/2}{1+\Delta tc/2}(V(t+\Delta t)+V(t)).$$

10. A non-transitory computer readable medium having instructions stored therein which, when executed by a computer, cause the computer to perform a method according to claim 1.

* * * * *